United States Patent
Chung et al.

(10) Patent No.: US 12,549,630 B2
(45) Date of Patent: Feb. 10, 2026

(54) SYSTEM AND METHOD FOR MANAGING DATA STORED IN A REMOTE COMPUTING ENVIRONMENT

(71) Applicant: The Toronto-Dominion Bank, Toronto (CA)

(72) Inventors: Sherman Chung, Toronto (CA); Nikita Islamov, Toronto (CA); Upal Sayeed Hossain, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 271 days.

(21) Appl. No.: 17/816,011

(22) Filed: Jul. 29, 2022

(65) Prior Publication Data
US 2024/0039993 A1    Feb. 1, 2024

(51) Int. Cl.
*H04L 67/1097* (2022.01)
*G06F 21/62* (2013.01)

(52) U.S. Cl.
CPC ...... *H04L 67/1097* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,615,199 B1 | 9/2003 | Bowman-Amuah | |
| 7,716,077 B1 | 5/2010 | Mikurak | |
| 7,761,319 B2 | 7/2010 | Gil et al. | |
| 8,060,400 B2 | 11/2011 | Wellman | |
| 8,341,270 B2 * | 12/2012 | Mazzaferri | G06F 21/629 718/1 |
| 9,594,791 B2 | 3/2017 | Bell et al. | |
| 10,360,231 B2 | 7/2019 | Hyde et al. | |
| 10,481,948 B2 | 11/2019 | Grenader | |
| 10,908,977 B1 | 2/2021 | Ferstay et al. | |
| 10,977,260 B2 | 4/2021 | Pal et al. | |
| 2014/0160931 A1 * | 6/2014 | Choi | H04L 47/125 370/235 |

(Continued)

FOREIGN PATENT DOCUMENTS

WO    2006/026673 A3    3/2006

*Primary Examiner* — Alexander Lagor
*Assistant Examiner* — Felicia Farrow
(74) *Attorney, Agent, or Firm* — CPST Intellectual Property Inc.; Brett J. Slaney; Amy Scouten

(57) ABSTRACT

A system, method and memory for managing remotely stored data is disclosed. The system is configured to provide an agent within a remote computing environment (RCE) with access to data stored on the RCE and custom applications. In some examples, the agent has access to one or more tools including aspects of a machine learning tool. Another agent on a local computing environment capable of communicating with the agent is provided. The other agent has access to configuration files. The other agent instructs the agent to execute custom applications based on the configuration files. The other agent receives metadata of the data in response to triggering the agent. The instructions cause the processor to populate, via the other agent, a catalogue of the plurality of data within the remote computing environment based on the received plurality of metadata, and provide the catalogue for display for reviewing the plurality of data.

20 Claims, 11 Drawing Sheets

(56) References Cited

U.S. PATENT DOCUMENTS

| | | |
|---|---|---|
| 2015/0039360 A1 | 2/2015 | Gowdra et al. |
| 2018/0143975 A1 | 5/2018 | Casal et al. |
| 2019/0018394 A1 | 1/2019 | Sayyarrodsari et al. |
| 2019/0392250 A1* | 12/2019 | Aggarwal ............... G06N 20/00 |
| 2020/0050586 A1 | 2/2020 | Pal et al. |
| 2020/0293193 A1* | 9/2020 | Littlefield ............. G06F 3/0641 |
| 2021/0152650 A1 | 5/2021 | Arivazhagan |
| 2021/0173846 A1 | 6/2021 | Verma et al. |
| 2021/0234925 A1 | 7/2021 | Cook et al. |
| 2022/0043671 A1 | 2/2022 | Vadapandeshwara et al. |
| 2022/0100748 A1 | 3/2022 | Ananthamurthy et al. |
| 2023/0350767 A1* | 11/2023 | Reza ..................... G06F 3/0611 |

* cited by examiner

SYSTEM AND METHOD FOR MANAGING DATA STORED IN A REMOTE COMPUTING ENVIRONMENT

TECHNICAL FIELD

The following relates generally to data management, and more specifically to managing data stored in a remote computing environment.

BACKGROUND

The proliferation of remote computing services (e.g., cloud computing) has led to previously locally housed data being stored in remote computing environments.

Managing remote computing services to implement desired functionality may be complicated and expensive. Each new functionality, such as updating the remote computing services with new data, may require specialized knowledge of the existence of previous data (e.g., specialized knowledge of existing business processes) and of procedures to publish the new data (e.g., specialized remote computing service knowledge, and specialized data protection knowledge). This is particularly the case when managing a plurality of data and a related plurality of desired functionalities. Therefore, infrastructures which enable functionality for remote computing environments at least one of efficiently, robustly, in a user-friendly manner, inexpensively (e.g., cloud computing costs, set up cost, etc.), adaptively, and accurately are desirable.

In addition, the possibility of accessing data, including sensitive data, becomes more universal with universal access to the remote computing services. Similarly, infrastructures which manage access to potentially universally available data in a remote computing environment at least one of efficiently, robustly, in a user-friendly manner, inexpensively (e.g., cloud computing costs, set up cost, etc.), adaptively, and accurately are desirable.

BRIEF DESCRIPTION OF THE DRAWINGS

Embodiments will now be described with reference to the appended drawings wherein.

DETAILED DESCRIPTION

Figure 1:
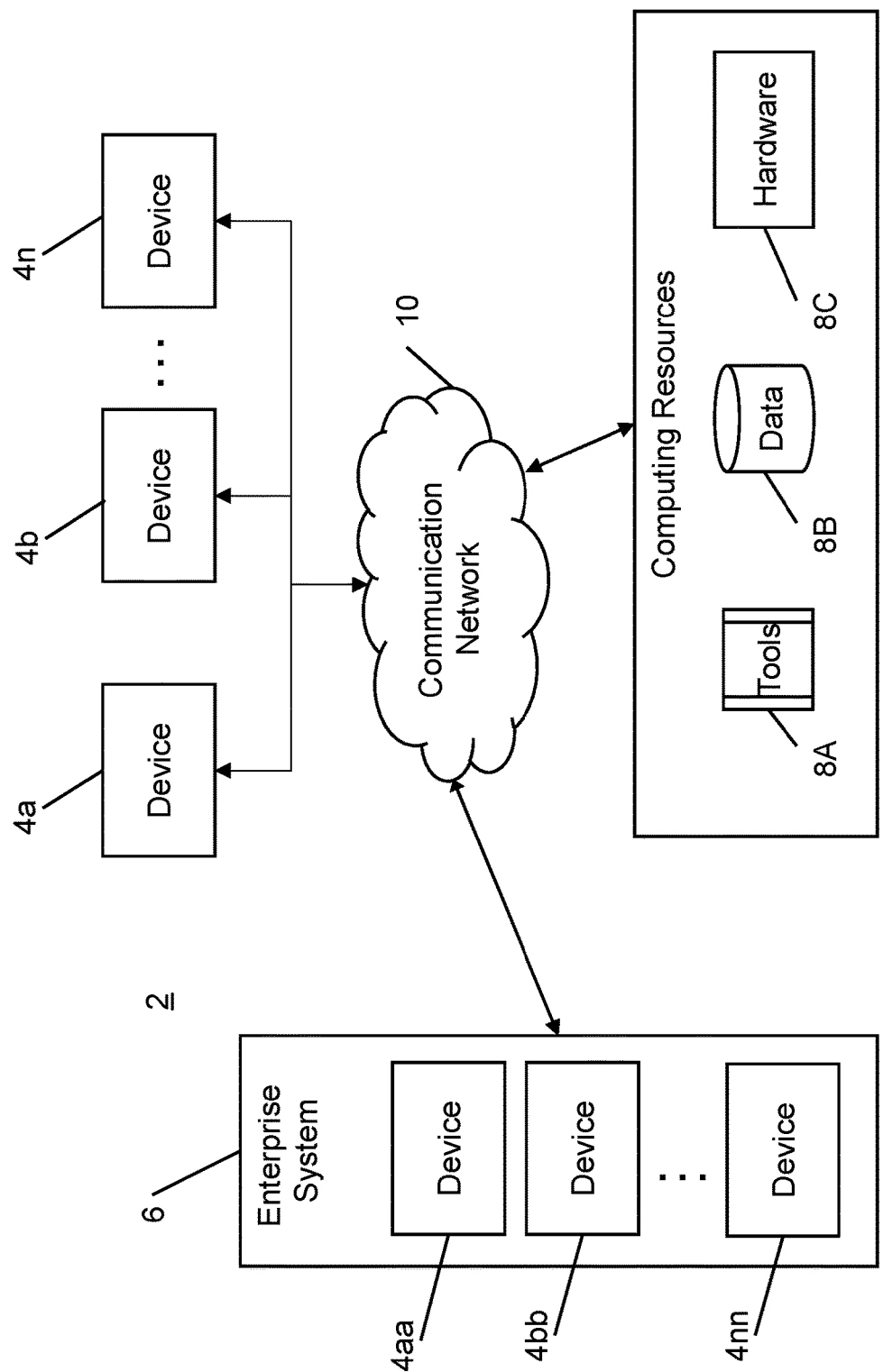
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The following generally relates to managing data stored in a remote computing environment.

A data catalog is configured to update the state of data sources of the enterprise data stored on the remote computing environment. The data catalog is populated by harvesting metadata of the data sources, and determining any updates based on a topology applied to add the data sources to the remote computing environment. In this way, an accurate picture of the state of the enterprise data stored on the remote computing environment can be achieved without exposing the data to the data catalog.

The data catalog can communicate with a local agent, with the local agent being in communication with a remote agent to retrieve metadata to populate the data catalog. The local agent can execute one or more custom applications (e.g., configured by the local agent) to harvest metadata. The custom application can have access to the topology to more efficiently update data by comparing the current state of the enterprise data within the remote system to the topology reflecting the previous state of the enterprise data. The custom application can be scheduled to run according to a batch process, to update the locally available data catalog overnight.

The data catalog can be configured to generate and maintain one or more views that provide a means to access the remotely stored enterprise data. The views can be preconfigured to incorporate metadata related to different data sources (e.g., new credit card data in Canada can automatically be used to populate a credit card data view) upon discovery. By updating views within the data catalog with the new metadata, fewer rules can be required to implement a data catalog, reducing complexity.

In another aspect, the following relates to managing access to data sources (e.g., data sources identified and updated by the custom applications). The data catalog can require that any new data be configured with data protections prior to making the metadata or the data visible within the data catalog.

The data protection policy can include applying a first set of masking parameters to data accessed via a data staging zone, and a second set of masking parameters defined by a view which is used to access the data staging.

The first set of masking parameters can be reversible, and, in some instances, the second set of masking parameters can be used to undo or precede the first set of masking parameters to enable access, via a view, to unmasked data.

A single view can incorporate data having different masking parameters applied. The masking parameters can be applied on a column level, and the first set of masking parameters may be applied where the second set of masking parameters are silent. In this way, access to the unmasked data alongside the masked data is possible within a single view, notwithstanding technical limitations introduced by the structure of the remote computing environment (e.g., the remote computing environment restricts the type or extent of masking tools that can be applied within a data staging zone).

In one aspect, a system for managing remotely stored data is disclosed. The system includes a processor, a communications module coupled to the processor, and a memory coupled to the processor, the memory storing computer executable instructions. The instructions, when executed by the processor, cause the processor to provide an agent within a remote computing environment. The agent has access to a plurality of data stored on the remote computing environment and one or more custom applications. The instructions cause the processor to provide another agent on a local computing environment. The other agent is able to communicate with the agent, and has access to one or more configuration files. The instructions cause the processor to instruct the agent, with the other agent, to execute at least one of the one or more custom applications based on a configuration file of the one or more configuration files. The other agent receives a plurality of metadata of the plurality of data in response to triggering the agent. The instructions cause the processor to populate, via the other agent, a catalogue of the plurality of data within the remote computing environment based on the received plurality of metadata. The instructions cause the processor to provide the catalogue for display for reviewing the plurality of data.

In example embodiments, the one or more custom applications are executed based on a topology which is expected to define the plurality of data, to determine which metadata to return to the agent.

In example embodiments, to determine which metadata to return to the agent, the instructions cause the processor to execute the one or more custom applications to harvest metadata of new data added to the plurality of data. New data is determined at least in part by reference to the topology.

In example embodiments, to populate the catalogue, the instructions cause the processor to access the plurality of data sets corresponding to one or more pre-existing data objects referenced in the topology. The one or more pre-existing data objects at least in part define the plurality of data sets. The instructions cause the processor to compare the accessed plurality of data sets to the one or more pre-existing data objects to determine new data for each data object.

In example embodiments, the catalogue comprises a plurality of views organizing the plurality of metadata. To display the catalogue, the instructions cause the processor to receive a request to access at least a part of the plurality of data, and respond to the request by providing access to the corresponding view related to the requested part.

In example embodiments, at least some of the plurality of views require different access credentials to review.

In example embodiments, at least some of the plurality of views comprise one or more profile fields, describing the bounds of the related data.

In example embodiments, at least some of the plurality of views comprise samples of the requested part.

In example embodiments, the instructions cause the processor to in response to receiving a request to access at least some of the plurality of data shown in a respective view, enable the view to display a sample of the requested data.

In example embodiments, the instructions cause the processor to, in response to receiving a request to restrict access to at least some of the plurality of data shown in a respective view, validate the request. The instructions cause the processor to restrict access to views showing the at least some of the plurality of data according to the request parameters.

In example embodiments, request parameters are masking parameters to obfuscate data.

In example embodiments, the other agent instructs the agent in response to receiving a request to view the plurality of data.

In example embodiments, the plurality of data is defined by a plurality of data objects in the configuration, and the related metadata for returned by the other agent is responsive to the plurality of data objects.

In another aspect, a method for managing remotely stored data is disclosed. The method includes providing an agent within a remote computing environment. The agent has access to a plurality of data stored on the remote computing environment and one or more custom applications. The method includes providing another agent on a local computing environment. The other agent is able to communicate with the agent, and the other agent has access to one or more configuration files. The method includes instructing the agent, with the other agent, to execute at least one of the one or more custom applications based on a configuration file of the one or more configuration files. The other agent receives a plurality of metadata of the plurality of data in response to triggering the agent. The method includes populating, via the other agent, a catalogue of the plurality of data within the remote computing environment based on the received plurality of metadata. The method includes providing the catalogue for display for reviewing the plurality of data.

In example embodiments, the one or more custom applications are executed based on a topology which is expected to define the plurality of data, to determine which metadata to return to the agent.

In example embodiments, determining which metadata to return to the agent comprises executing the one or more custom applications to harvest metadata of new data added to the plurality of data. New data is determined at least in part by reference to the topology.

In example embodiments, populating the catalogue comprises accessing the plurality of data sets corresponding to one or more pre-existing data objects referenced in the topology. The one or more pre-existing data objects at least in part define the plurality of data sets. The method includes comparing the accessed plurality of data sets to the one or more pre-existing data objects to determine new data for each data object.

In example embodiments, the catalogue comprises a plurality of views organizing the plurality of metadata, and displaying the catalogue comprises receiving a request to access at least a part of the plurality of data, and responding to the request by providing access to the corresponding view related to the requested part.

In example embodiments, at least some of the plurality of views require different access credentials to review.

In another aspect, a non-transitory computer readable medium (CRM) for managing remotely stored data is disclosed. The CRM includes computer executable instructions for providing an agent within a remote computing environment. The agent has access to a plurality of data stored on the remote computing environment and one or more custom applications. The CRM includes computer executable instructions for providing another agent on a local computing environment. The other agent is able to communicate with the agent, and has access to one or more configuration files. The CRM includes computer executable instructions for instructing the agent, with the other agent, to execute at least one of the one or more custom applications based on a configuration file of the one or more configuration files. The other agent receives a plurality of metadata of the plurality of data in response to triggering the agent. The CRM includes computer executable instructions for populating, via the other agent, a catalogue of the plurality of data within the remote computing environment based on the received plurality of metadata. The CRM includes computer executable instructions for providing the catalogue for display for reviewing the plurality of data.

Referring now to FIG. 1, an exemplary computing environment 2 is illustrated. In the example embodiment shown, the computing environment 2 includes an enterprise system 6, one or more devices 4 (shown as devices 4a, 4b, . . . 4n, external to the enterprise system 6, and devices 4aa, 4bb, and 4nn, internal to the enterprise system 6), and a remote computing environment 8 (shown individually as tool(s) 8A, database(s) 8B, and hardware 8C). Each of these components can be connected by a communications network 10 to one or more other components of the computing environment 2. The one or more devices 4 may hereinafter be referred to in the singular for ease of reference.

An external device 4 can be operated by a party other than the party which controls the enterprise system 6; conversely, an internal device 4 can be operated by the party in control of the enterprise system 6. Any device 4 can be used by different users, and with different user or project accounts. For example, the internal device 4 can be used by an employee, third party contractor, customer, a project user, etc., as can the external device 4. The user may be required to be authenticated prior to accessing the device 4, the device 4 can be required to be authenticated prior to accessing either the enterprise system 6 or the remote computing environment 8, or any specific accounts or resources within computing environment 2.

The device 4 can access information within the enterprise system 6 or remote computing environment 8 in a variety of ways. For example, the device 4 can access the enterprise system 6 via a web-based application, or a dedicated application, etc. Access can require the provisioning of distinct types of credentials (e.g., login credentials, two factor authentication, etc.). In example embodiments, each different device 4 can be provided with a unique degree of access, or variations thereof. For example, the internal device 4 can be provided with a greater degree of access to the enterprise system 6 as compared to the external device 4.

Devices 4 can include, but are not limited to, one or more of a personal computer, a laptop computer, a tablet computer, a server, a desktop computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The remote computing environment 8 (hereinafter referred to in the alternative as computing resources 8) includes resources which are stored or managed by a party other than operator of the enterprise system 6 and are used by, or available to, the enterprise system 6. For example, the computing resources 8 can include cloud-based storage services (e.g., database(s) 8B). In at least some example embodiments, the computing resources 8 include one or more tools 8A developed or hosted by the external party, or tools 8A for interacting with the computing resources 8. In at least one contemplated embodiment, the tool 8A (referred to in the singular for ease of reference) is a tool for accessing data storage, or a tool for masking data, within the computing resources 8. Further particularizing the example, the tool 8A can allow a device 4 (e.g., internal device 4aa) to access the computing resources 8, and to configure a masking procedure based on one or more masking parameters to ensure data is not made available to individuals without the credentials to access the data. The tool 8A can be or include aspects of a machine learning tool, or be a tool associated with the Microsoft™ Azure™ suite of cloud computing solutions, etc. The computing resources 8 can also include hardware resources 8C, such as access to processing capability of server devices (e.g., cloud computing), and so forth.

Communication network 10 may include a telephone network, cellular, and/or data communication network to connect distinct types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 or the computing resources 8, or between devices 4, wherein an internal or other shared network provides the necessary communications infrastructure.

The computing environment 2 can also include a cryptographic server or module for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 8, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 6 or device 4. The cryptographic server can used to protect data within the computing environment 2 (e.g., including data stored in database(s) 8B) by way of masking, or encryption for data protection, digital signatures or message digests for data integrity, and by using digital certificates to authenticate the identity of the users and entity devices with which the enterprise system 6, computing resources 8, or the device 4 communicates, to inhibit data breaches by adversaries. It can be appreciated that various cryptographic mechanisms and protocols can be chosen and implemented to suit the constraints and requirements of the computing environment 2, as is known in the art. In at least some contemplated example embodiments, the cryptographic server is used to mask data according to masking parameters (as that term is used herein).

The enterprise system 6 can be understood to encompass the whole of the enterprise, a subset of a wider enterprise system (not shown), such as a system serving a subsidiary or a system for a particular branch or team of the enterprise (e.g., a resource migration division of the enterprise).

The enterprise system 6 may store a plurality of data sets in the computing resources 8 (e.g., within the database 8B) of such a scale that it makes the plurality of data sets are difficult to manage. For example, financial institutions such as commercial banks generate vast amounts of data for various different operations (personal banking, investing, lending, web-based services, etc.). The different operations can have dynamic, and varied approaches to managing the data generated for the operations (e.g., different regulatory requirements can impose different record-keeping requirements, data can be stored in different formats owing to legacy digital infrastructure, different management initiatives can result in data being stored in different formats, locations, with different permissions etc.).

The vast amounts of records (new or existing), and their diverse and distinct nature can make it difficult to enable functionalities which depend on the data. For example, the tool 8A which allows for viewing data within the plurality of data sets can be required to merge together various data sets, which can have a changing composition and/or storage schema (e.g., location within a data lake, metadata parameters, storage schema (e.g., data representations (mm/dd/yy vs mm/dd/yyyy, etc.)), etc.).

In addition, it can be difficult to robustly police data access to the constantly changing data. For example, new data can be inadvertently added so as to be visible to users without the proper credentials. Moreover, distinct types of data access can be difficult to manage (i.e., require many layers of approval) as user access rights can lack the granularity desired of the data protections, and user access rights can change over time.

Figure 2:
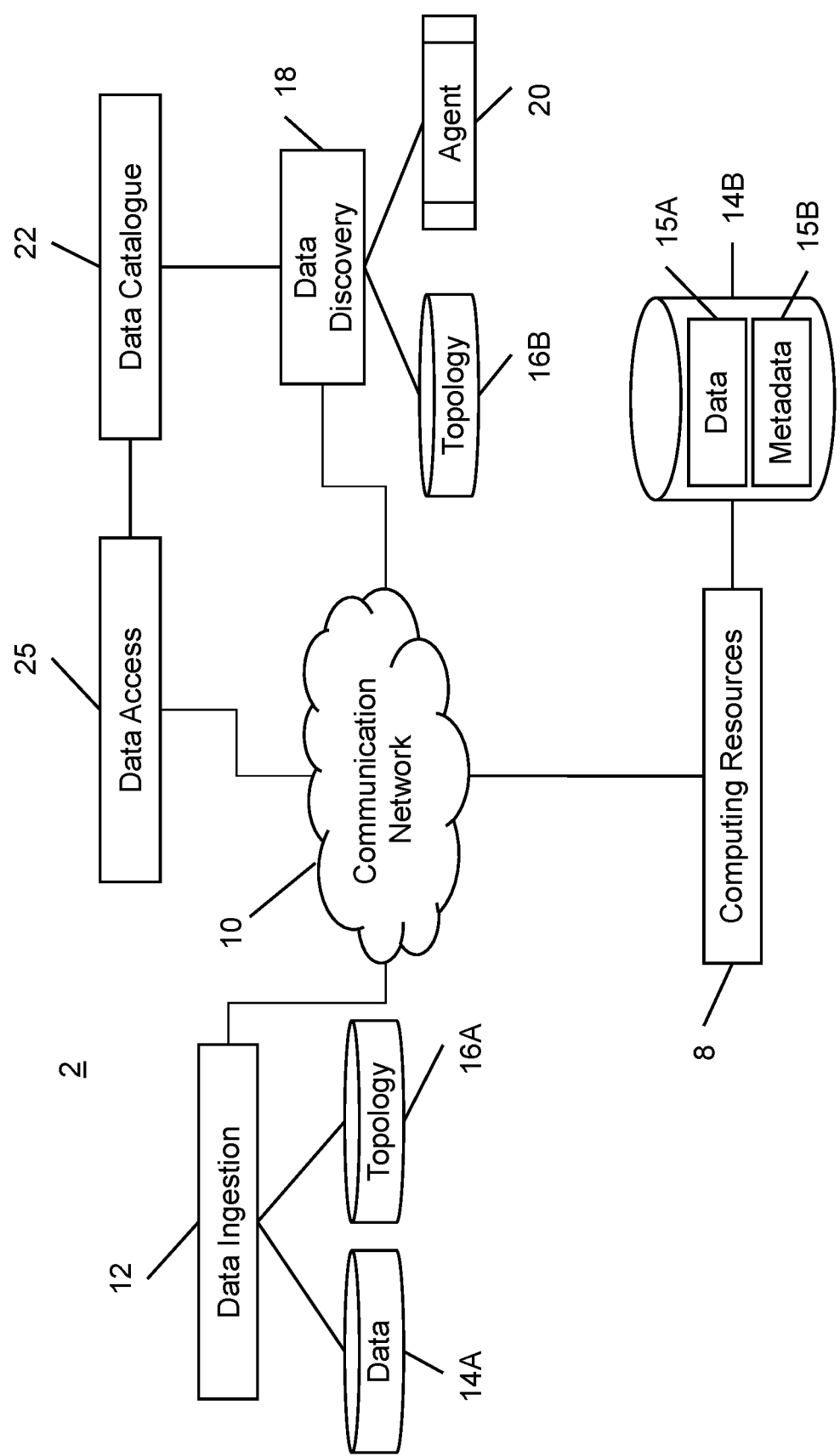
FIG. 2 is a block diagram of an example framework for managing remotely stored data is shown.

Referring now to FIG. 2, a block diagram of an example framework for managing remotely stored data is shown.

A data ingestion module 12 transmits data 14 (alternatively referred to as a plurality of data sets) from the enterprise system 6 to the computing resources 8. The data ingestion module 12 can be a module on the internal device 4, or a server of the enterprise system 6, and the like. In some examples, the ingestion module 12 is operated by a system external to the enterprise 6 (e.g., an out-of-network automated teller machine). The data ingestion module 12 can transmit the data 14 for storage to the computing resources 8 periodically, in real time, or near real time.

The data ingestion module 12 can have access to a topology 16A defining an organizational principle by which data 14 is stored in the computing resources 8. For example, the topology 16A can be defined in part based on a storage account, a subscription, and a container identification within computing resources 8 implementing Microsoft™ Azure™ Data Lake Storage (ALDS) protocols. In one example, different business units can be given different storage accounts, different operations within a business unit can be given different subscriptions, and different teams operating within an operation can be given different container identifications for uploading data 14. The data ingestion module 12 can therefore store data 14, or cause data 14 to be stored, within the computing resources 8 according to the topology 16A.

The topology 16 can define the types of data objects that the enterprise system 6 uses to store data 14. In example embodiments, data ingestion module 12 provides a user interface including a drop-down menu to ensure that ingested data 14 adheres to the topology and the data objects outlined therein.

Data 14 (i.e., data 14A) ingested into the computing resources 8 can include substantive data and metadata, and while represented as a single source, it is understood that the data 14 can originate from a plurality of dissimilar sources. The metadata can be related to the substantive data, to the creation of the substantive data, to the storage of the substantive data, the users associated with or related to operations or manipulations performed on the substantive data, etc.

The data ingestion module 12 can provide all or some of the data 14A, including the substantive and the metadata, for ingestion into computing resources 8. The computing resources 8 can store the data 14A as substantive data (denoted by data 15A) and the metadata (denoted by metadata 15B). The computing resources 8 can be given permission to, or be configured to, add to the metadata 15B. For example, the computing resources 8 can add metadata related to the ingestion (e.g., at time of ingestion, the originating data source, etc.).

Uploading data 14 to the computing resources 8 does not necessarily alert or update existing systems within the enterprise system 6 to the data 14. For example, business users are not typically alerted to updated data, or to the addition of new data which may be pertinent to their field of operations. Particularizing an example, a data scientist user may not be alerted to the addition of new credit card customer data which may be relevant to an existing project.

A data discovery module 18 can be used to discover data 14 uploaded to the computing resources 8 by the enterprise system 6. The data discovery module 18 can span the entire enterprise, and discover any or some data 14 uploaded by the enterprise system 6 to the computing resources.

In example embodiments, the data discovery module 18 can be configured to discover only new data within the data 14B uploaded to the computing resources 8 by the enterprise system 6. As will be discussed herein, the data discovery module 18 can utilize the topology 16B, and an agent 20 to do so.

In at least some contemplated embodiments, the data discovery module 18 has access to a limited subset of the topology 16A, denoted by the topology 16B, to discover the data 14B. The enterprise system 6 may be less vulnerable to adversarial actions because of limiting the information known to the data ingestion module 12.

The agent 20 is shown as being an element of the data discovery module 18. It can be appreciated that the agent 20 can be an element of, or interact with, the data catalog 22, or an element executed in part by some combination of the data catalog 22 and the data discovery module 18.

The data discovery module 18 updates the data catalog 22 with metadata 15B of the discovered data 14B. The data discovery module 18 can be configured to update the data catalog 22 with a portion of the discovered data 14B (e.g., a sample of the data 14B to allow a user reviewing the data catalog 22 to understand the nature of data 14B).

Access to the data 14B stored in the computing resources 8 can be controlled by a data access module 25. The data access module 25 can be configured to resolve requests for access to the data 14B. In at least one contemplated example embodiment, the data access module 25 is integrated within the data catalog 22 to enable users to access the data 14B via the data catalog 22.

Although shown separately, it is understood the data ingestion module 12, the data catalog 22, the data access module 25, and the data discovery module 18 can be part of a single application operating within the enterprise system 6. It is also understood that one or more of the data ingestion module 12, the data catalog 22, the data access module 25, and the data discovery module 18 can be executed at least in part remote to the enterprise system 6, and interact with enterprise system 6 components to enact their functionality described herein.

Figure 3:
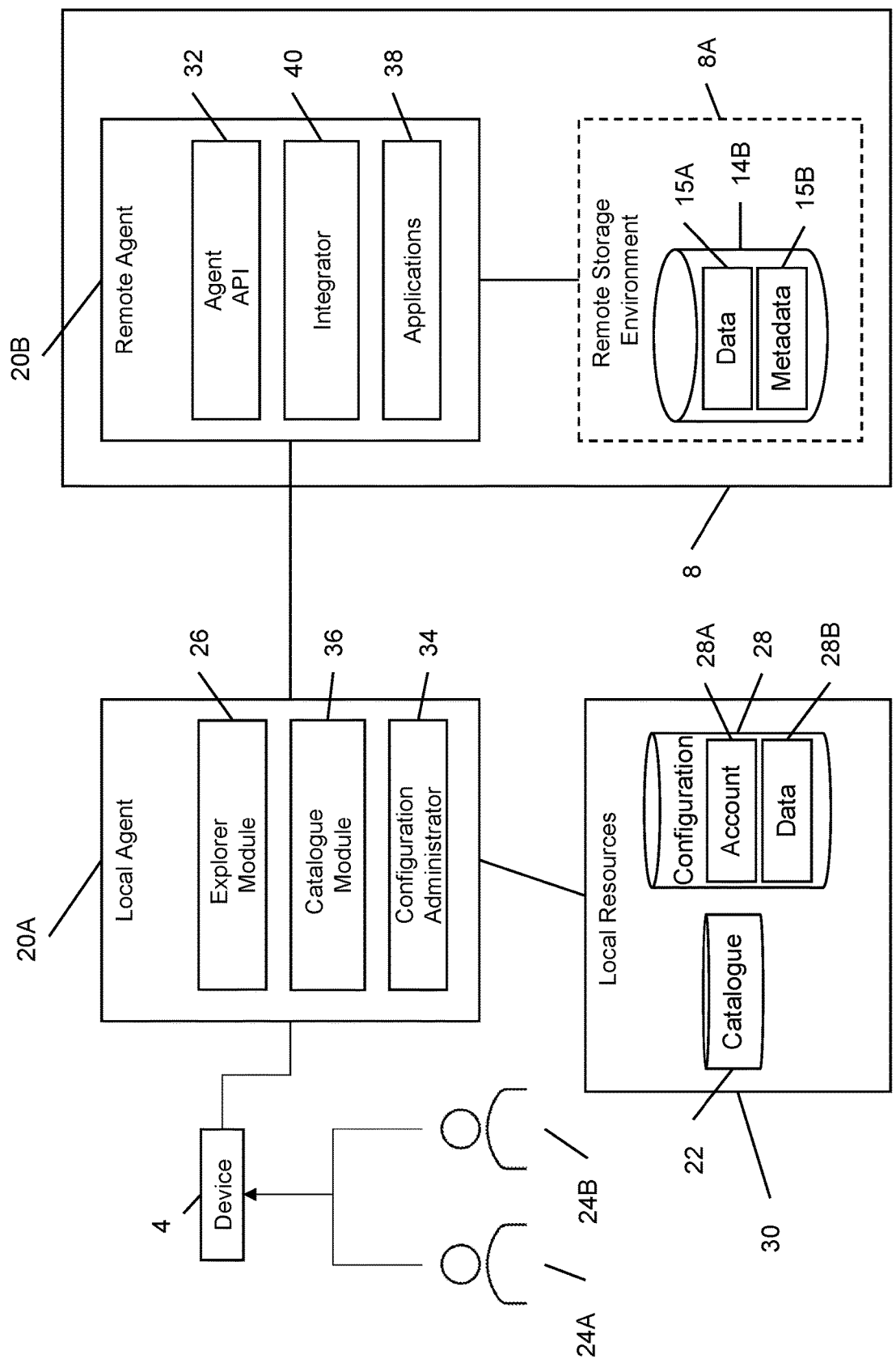
FIG. 3 is a block diagram of an example framework for managing data within a remote computing environment.

Referring now to FIG. 3, a block diagram of an example framework for managing data within a remote computing environment 8 is shown.

A plurality of user accounts 24 (shown and hereinafter referred to as 'users', for simplification), can be used to access metadata 15B related to the data 14B. The user accounts 24 can be of a variety of different user types. For example, the framework can accommodate an operations user 24A accessing the local agent 20A operating on the device 4 to view the metadata 15B. The operations user 24A can have credentials to configure one or more functionalities of the agent 20, to perform analysis of business scenarios (e.g., evaluate credit card offering uptake), and so forth.

The local agent 20A provides access to the metadata 15B, or the data 15A, via the data catalog 22. In respect of the metadata 15B, the local agent 20A can be configured to populate the data catalog 22 with metadata reflecting the current state of data 14B. In respect of data 15A, the local agent 20A can enable a user 24 access to the data via, for example, the data catalog 22.

The different user accounts 24, or distinct types of user accounts 24, can have access to various parts of the agent 20. In example embodiments, the agent 20 functionality is segregated based on the different user accounts 24. For example, the business user 24B can have access to an explorer module 26, which enables the business user 24B to view the data catalog 22.

The explorer module 26 can facilitate viewing of metadata 15B, to which the user account 24 used to access the explorer module 26 has access to.

The explorer module 26 can permit the user account 24 to request greater access to the data 14B, or access to functionality associated therewith. For example, the explorer module 26 can enable a business user 24B to: review metadata 15B associated with newly added data to data 15A, which includes credit card customer data (e.g., data related to subscriptions for a new credit card offering), request additional access to the underlying credit card customer data 15A, and/or implement or more generally make use of machine learning applications to perform analysis on the customer data 15A, etc.

A configuration 28 defines access to data, and can include a user account specific account configuration 28A, and a data specific configuration 28B. The configuration repository 28 can be hosted locally, within a local resource 30, or at least in part on the remote computing resources.

The account configuration 28A to define, via parameters, access by a user, a group of users, such as a project zone, etc. The account configuration 28A can be subject to review and/or modifications over time. The user access rights stored in the account configuration 28A can be data source, or view, specific. For example, the account configuration 28A can define whether a user has access to certain sensitive areas within the data catalog 22.

The account configuration 28A can also define the nature of the access provided to the user. For example, the account configuration 28A can have one or more masking parameters for masking data accessed with the account configuration 28A.

The configuration 28 can include data configurations 28B of the data 14B. The data configurations 28B can include possible configurations of data or data sources expected to be stored in data 14B. The data configurations 28B can be based on one or more of a data object, a data model, a view, and a data profile of data 14B.

A data object can be used to define data sources within the computing resources 8 belonging to, or being managed by, the enterprise system 6. For example, a database used by a credit card division of a commercial bank can be defined by a data object. The data object can identify individuals responsible for maintaining the data source, the amount of data within the data source, the physical location(s) storing the data, how access to the data source is acquired, etc.

Each data object can be related to one or more data models. A data model defines the substantive data stored within the data source. For example, the data model can define a format of the data within the data source, the number of substantive entries, the order of data within the data source (e.g., age, address, etc.), encryption used to encrypt the data source, etc.

Data models can be used to identify a type of a data source. For example, a data model be used to identify a new data source as including data other than customer data, or, more specifically, to identify the new data source as including publicly available stock market information maintained by a particular business unit. In at least some example embodiments, the data models are integrated within the data object.

Data objects and data models can be preconfigured. For example, the enterprise system 6 can, because of implementing the topology 16, ingest data sources which satisfy existing data objects and data models. In this way, new data sources can be identified and categorized by the agent 20. Data sources which do not comply with the existing data objects and data models can be filed for further inspection and categorization.

The data objects and the data models can be used to define a view of the data 14B. Some or all data 15A from different data objects can be assigned to a view. For example, a data source of credit card point redemptions can be assigned to a view related to the credit card division of a commercial bank, which view can include another data source related to credit card usage.

Views can be preconfigured, or certain user accounts 24 (e.g., data owner user accounts 24) can be used to generate new views. An enterprise 6 can publish configured views and only allow internal devices 4 to access the published list of views.

Views can be used to simplify the process of retrieving data for data consumers, while potentially enabling robust data access policing. For example, an internal consultant user account 24 can be expected to focus on views related to the subject of their consulting. Particularizing the example, an internal consultant assisting with call center operations may be limited to accessing views associated with call centers. By providing default views which aggregate data associated with call centers, the internal consultant's ability to navigate to relevant data can decrease the amount of time spent searching through the data 14B within the computing resources 8. Publishing the list of the preconfigured view, for example, in the data catalog 22 can facilitate centralizing all data navigation and access tasks.

Access to views can be limited in a variety of manners. For example, a view can limit access to the underlying data other than data to enable a reviewer to determine whether to request access to the view. For example, a view can include a sample of data 15A including live entries, and access to the view can be controlled to enable access to only the column labels to determine whether to request full access to the view.

Data profiles describe the substantive data without revealing the underlying substantive data. For example, a data profile can be used to denote a value range of a particular column of the data.

A configuration administrator 34 can be used to edit, create, or otherwise manipulate configurations 28. For example, the configuration administrator 34 can be used to define the one or more views of the metadata 15B. The configuration administrator 34 can be used to implement and create permissions for accessing the local agent 20A, such as defining user access rights, creating, and defining new user access rights, etc. The configuration administrator 34 can work in concert with a catalog module 36 which generates a user interface (UI) to facilitate manipulation of the configurations (hereinafter, the configuration administrator 34 and the catalog module 36 may be referred to simply as the catalog module, for ease of reference).

The current state of the data 14B can be stored in the data catalog 22, with the configuration 28 defining all data configurations 28B visible to the local agent 20A. In this way, the data catalog 22 can be made available to the device 4 to allow users to understand, navigate, and configure certain functionalities (e.g., with the catalog module) associated with the data 14B.

To achieve the required access to facilitate viewing of, or manipulating of functionalities associated with the data 14B, the local agent 20A can be configured to communicate with a complementary remote agent 20B executed within the remote computing environment 8. The remote agent 20B can access the data 14B, shown as stored within a special-purpose remote storage environment 8A, and return metadata 15B related to the data 15A to the local agent 20A.

Similar to the local agent 20A, the remote agent 20B can include one or more elements to facilitate functionality. For example, an agent application programming interface (API) 32 can be used to retrieve metadata 15B, or data 15A, for use with the explorer module 26.

An integrator 40 can be used to communicate with and receive instructions from the catalog module of the local agent 20A.

The remote agent 20B includes one or more applications 38. The applications 38 can be configured by the user account 24, via the configuration administrator 34, for example.

Each application 38 facilitates one or more interactions with, or functionalities based on, the data 14B. A variety of different applications 38 are contemplated. For example, one application 38 (or an aspect of an application 38) can have access to the topology 16B (e.g., which can define data objects, data models, data profiles, etc.) to scan the data 14B for any new data. The application 38 can: harvest metadata 15B related to any new data within the data 15A, and return same to, for example, the explorer module 26; apply one or more masking parameters to the data 14B before providing the harvested metadata to the local agent 20A; determine credentials required to access certain parts of the data 14B; define a procedure for requesting greater access to the data 14B, and so forth.

Figure 4:
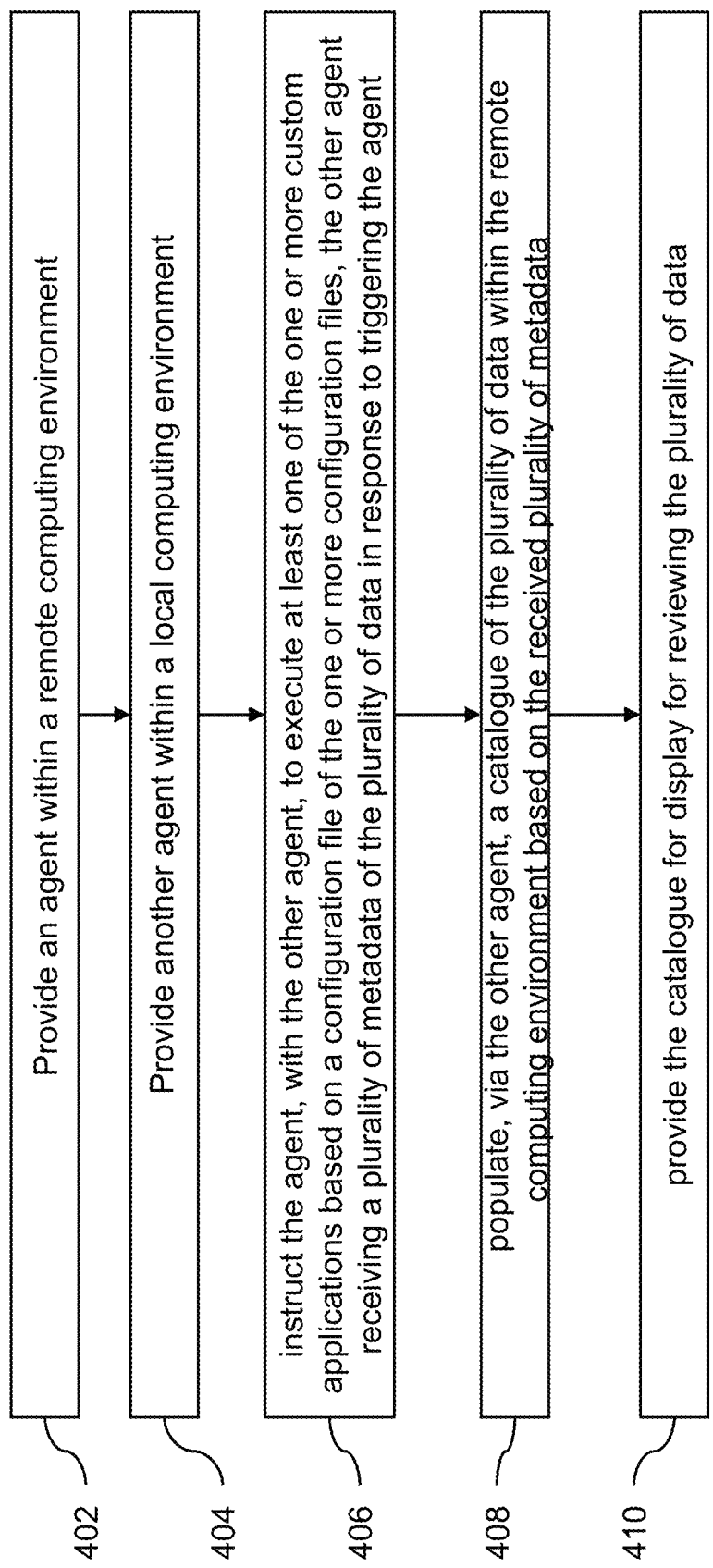
FIG. 4 a flow diagram of an example method for managing data.

Referring now to FIG. 4, a flow diagram of an example method for managing data is shown. FIG. 4 shall be described with reference to elements in the preceding figures, solely for illustrative purposes. It is understood that the discussion of FIG. 4 with reference to the preceding figures is not limiting in any way.

At block 402, a remote agent 20B is provided within the remote computing environment 8. Providing can include instantiating or otherwise causing the remote agent 20B to be available for operation.

At block 404, a local agent 20A is provided within a local computing environment (e.g., an internal device 4). As with the remote agent 20B, providing the local agent 28 can include instantiating or otherwise causing the local agent 20A to be available for operation.

At block 406, the local agent 20A instructs the remote agent 20B to execute at least one of the one or more custom applications 38. The local agent 20A can generate instructions based on the configuration associated with the request. For example, the configuration can require the local agent 20A to update the explorer module 26 or the catalog module 36 overnight. As a result, the local agent 20A can instruct the remote agent 20B to provide up to date metadata 15B (e.g., via the application 38) of all data 14B stored in the remote computing environment 8 to the local agent 20A to populate the data catalog 22.

In another example, the application 38 is responsible for populating a new view. In this example, the application 38 can be responsible for performing one or more formatting operations to an existing data source to harmonize a first data source with a second data source also in the view.

At block 408, the data catalog 22 is populated with the metadata 15B received by the local agent 20A. In this way, the explorer module 26 or the catalog module 36 can access the data catalog 22 to receive up-to-date metadata reflecting the state of the data 14B in the computing resources 8.

At block 410, the data catalog 22 is provided for reviewing the data 14B. For example, the data catalog 22 can be provided to the explorer module 26, or made available via a web application, etc.

Figure 5:
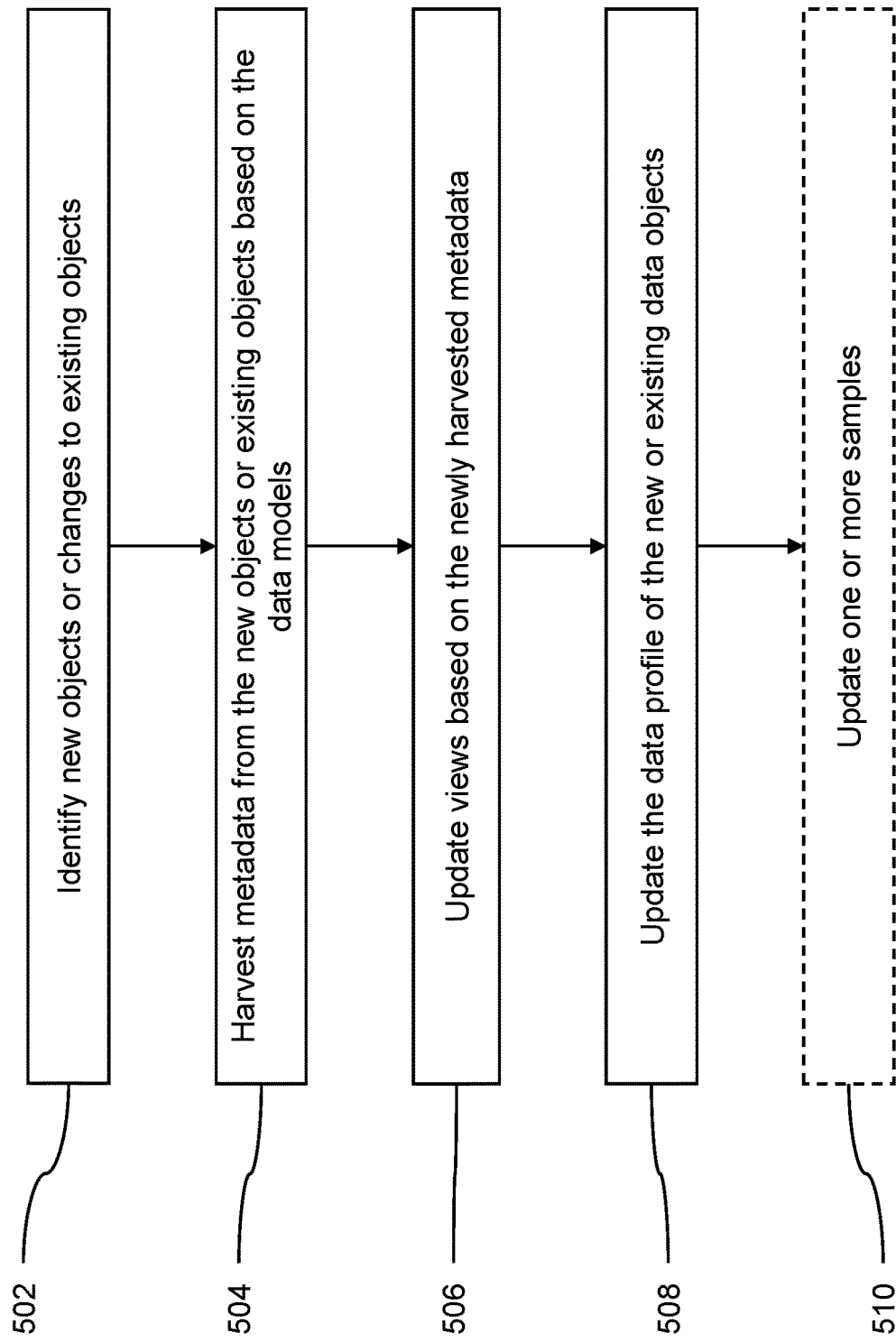
FIG. 5 is a flow diagram of another partial example method for performing part of the method.

FIG. 5 shows a flow diagram of an example method for performing part of the method (e.g., blocks 406 and 408) shown in FIG. 4.

At block 502, the application 38 identifies new data objects, or changes to existing data objects, within the metadata 15B or data 15A. For example, the application 38 can be provided with data configurations 28B and/or the data catalog 22 (e.g., from the local resources 30, or from a repository within the remote computing environment 8 (not shown)), and determine whether the current state of data 15B includes any changes to the data catalog 22. Determining changes can include comparing the data 14B to the topology 16, and/or the data catalog 22, to determine discrepancies.

In instances where a new data source has been identified, the new data source may be classified based on the data models defined within the data configurations 28B.

Block 502 can be limited to seeking updates within certain portions of the data 14B. For example, the data configurations 28B can define the paths that the application 38 is required to check for updated or new data objects, and new or updated data objects outside of the specified locations are not updated. This can preferably allow for more granular control of the agent 20, and prevent possible bottlenecks to updating the data catalog 22.

At block 504, metadata from the identified new or updated objects is harvested (e.g., in the case of a new data object, all column headers are stored in a new data object or model defining the data source). Metadata can be harvested from different new or updated objects in parallel. For example, the application 38 can be configured to process, in parallel, the harvesting of metadata of the new objects based on one or more cost metrics. Parallel harvesting can be implemented based on model types, with all data models of a particular type being updated in parallel to avoid the perception of piecemeal updating.

At block 506, the data catalog 22 is updated with the harvested metadata. For example, the views defined by the data catalog 22 are updated to reflect the new metadata. Block 506 can include a partial update, where the view is updated to reflect the existence of new data, but not all data comprising a view is updated.

At block 508, data profiles of the data configurations 28B are updated based on the harvested metadata. The data profiles, similar to the block 504, can be updated in parallel.

At block 510, optionally, samples 602 (FIG. 6) of the views are updated.

Figure 6:
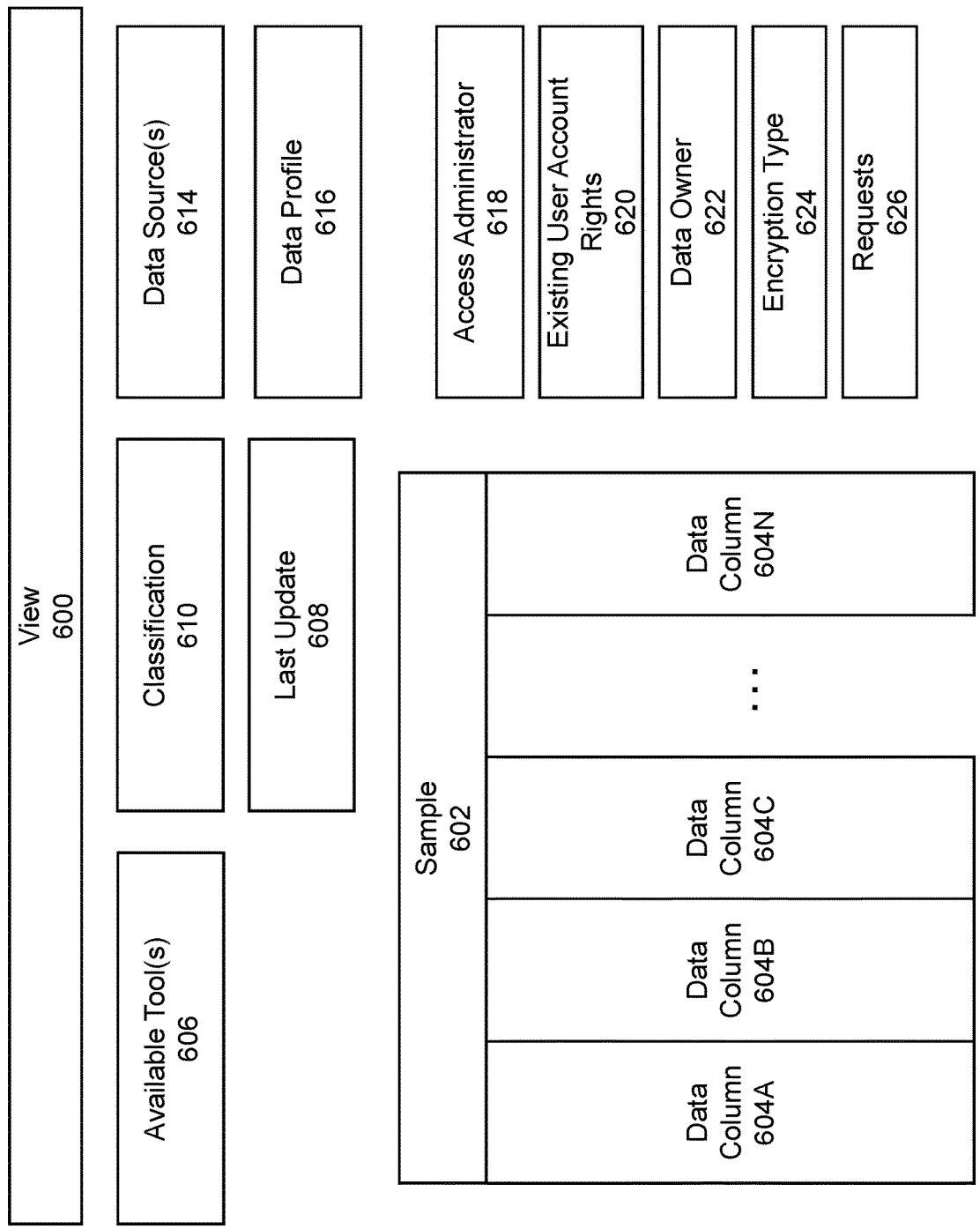
FIG. 6 is a wireframe diagram of an example view.

FIG. 6 is a wireframe diagram of an example view 600.

The view 600 includes a sample panel 602 of one or more data columns 604 (denoted by columns 604*a* to 604*n*). As will be discussed herein, the sample panel 602 can be updated last to ensure that data protection procedures are adhered to.

The example view 600 includes a variety of metadata, including: (1) an element 606 indication available tools (e.g., to manipulate the view 600, or the process of generating the view 600). The element 608 can, for example, enable access to the configuration administrator 34, (2) an element 608 indicating the recency of the view, (3) an element 610 indicating the data configuration 28B applied (4), an element 614 identifying the data sources used to construct the view 600, and (5) an element 616 describing the data profile(s), for example, sample 602 (e.g., a selected data: 604).

The example view 600 includes metadata related to data access policies. For example, the shown view 600 includes: (1) an element 618 identifying the access administrator, (2) an element 620 identifying the existing account configuration 28A associated with the view, (3) an element 622 identifying a data owner, (4) an element 624 identifying the type of encryption used or required to view the sample 602, and (5) and element 626 enabling submitting requests to gain greater access to the data via the view 600, or to gain functionality associated therewith.

The data catalog 22 can further be configured to provide access to the data underlying the metadata shown in the views as described to this point in this disclosure.

Figure 7:
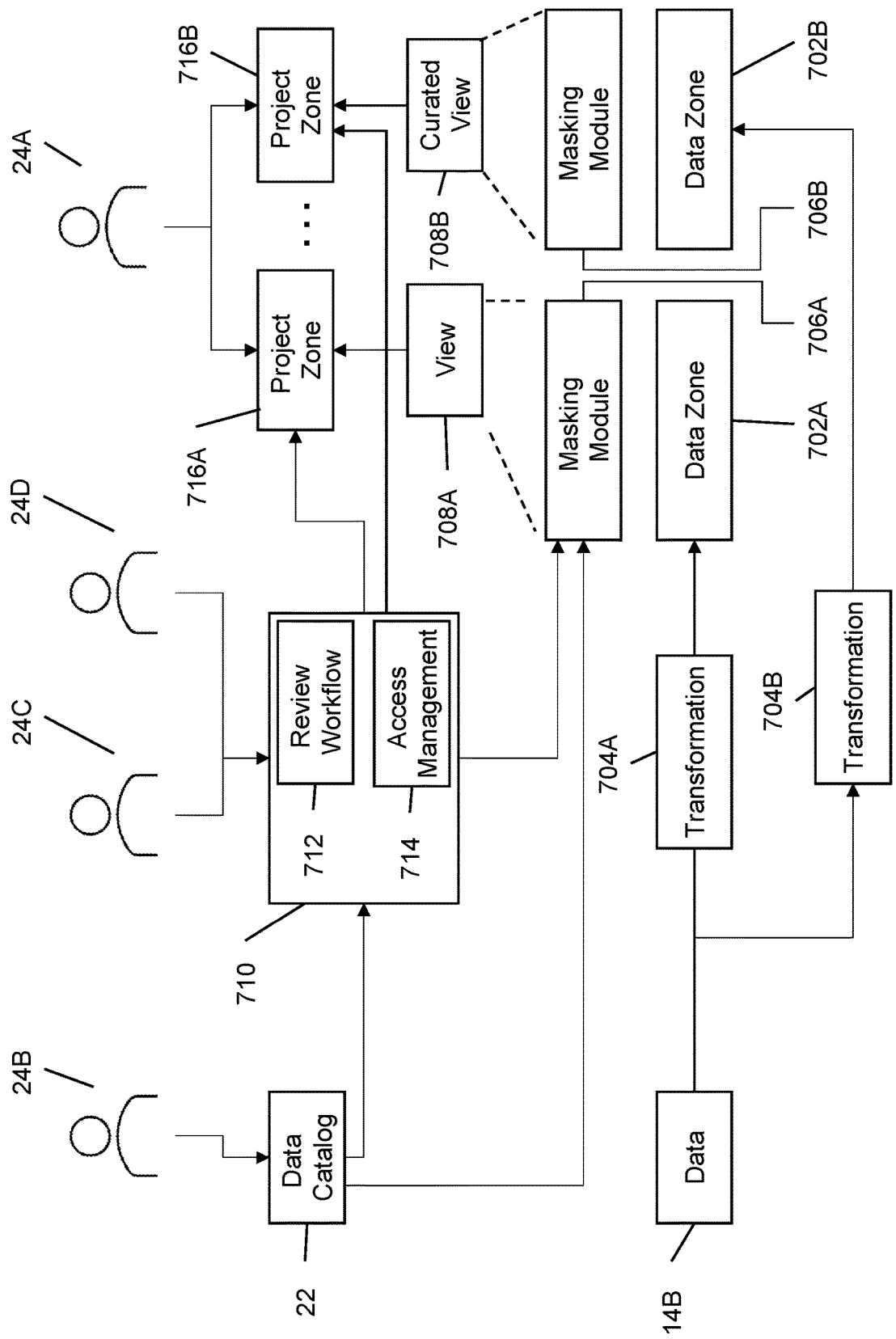
FIG. 7 is a block diagram of an example framework for providing access to remotely stored data sets.

Referring now to FIG. 7, a block diagram of an example framework for providing access to remotely stored data sets is shown.

Remotely stored data 14B can be transmitted to one or more database staging zones 702 for viewing. Different data staging zones, such as the shown data staging zones 702A and 702B, can be configured to provide access to different instances of the data 14B. For example, in the shown embodiment, each data staging zone 702 results from a different transformation 704 being applied to the data 14B. The data staging zone 702A can be configured to receive data 14B to which the transformation 704A has been applied, whereas data staging zone 702B can be configured to receive data 14B via a transformation 704B. The transformations 704 can be transformations which do not substantively alter the data 14B. For example, the transformation 704A can format dates of different data sets within the data 14B into a common format. In another example, the transformation 704B can be a transformation which sorts the data. In at least some contemplated example embodiments, some data staging zones 702 do not include any transformations.

Different data staging zones 702 can also be used to segregate data based on the expected nature of access to be granted. For example, the data staging zone 702A can be configured to store only a portion of the data 14B which is mundane (e.g., publicly available data), without regard to expected access. In contrast, the data staging zone 702B can be configured to store some, or only, sensitive data within the data 14B, and therefore access to the data staging zone 702B can be limited in some fashion (e.g., only certain views may be configured to view certain data staging zones, the data staging zone 702B discoverability can be limited, e.g., via the data catalog 22, etc.).

Data within the data staging zone 702A can be viewed after one or more masking module(s) 706 manipulate the data 14B accessed via the data staging zone 702.

The masking module 706 can include a first set of masking parameters, applied to all data within the data staging zone 702. The first set of masking parameters can be reversible. In contrast to existing masking procedures which alter the substance of the data irreversibly or almost irreversibly, the first set of masking parameters maintain the ability for a user to access unmasked data in the data staging zone 702. For example, the first set of masking parameters may be parameters defining a type and extent of redaction. The redaction can be partial, such as obscuring other than the first initial of a name, and can be of different types (e.g., show the full extent of the masking, or show only that redactions are present, etc.).

The first set of masking parameters, in example embodiments, are limited to the masking parameters provided by the operator of the remote computing environment 8. The remote computing environment 8 operator provided masking parameters can be ineffective or preclude integration into a desirable modular masking framework. For example, the first set of masking parameters can allow for application of only certain types of masking (e.g., redaction) to data staging zones 702, as the remote computing environment 8 assumes that data staging zones 702 are not used for unmasked data. Moreover, the implementation of the remote computing environment 8 may preclude the first masking parameters from operating in a desirable fashion. For example, the Microsoft Azure environment may only allow for masking parameters, via a dropdown menu, to apply to data within the data staging zone 702 viewed via a view 708. Some Microsoft Azure remote computing environments 8 may require different data staging zones 702 for masked and unmasked data, limiting masking parameters that can be applied in the generation of views 708. The first set of masking parameters may be insufficient to implement a desirable modular masking framework, or charging relatively high rates for access to certain masking parameters making them prohibitively expensive.

The masking module 706 also includes a second set of masking parameters. The second set of masking parameters can be configured by one or more custom applications (e.g., custom application 38) to mask data within the data staging zone 702 that is available via a view 708. For example, the second set of masking parameters can be used to apply operations to data once a view 708 is populated, and enable masking policies in addition to the first set of masking parameters provided by the computing resources 8. The first set of masking parameters can define redaction operations, and the second set of masking parameters can define tokenization parameters.

The second set of masking parameters are associated with a set of access parameters provided by the account 24 requesting access to the data 14B. The second set of masking parameters can be provided by a third-party service provider, or developed uniquely for the enterprise system 6 or the view to which they are intended to apply.

The second set of masking parameters can tokenize the data for viewing or access in accordance with the set of access rights. Tokenized data can remove the possibility that any data inadvertently masked by the first set of masking parameters are intelligible.

The second set of masking parameters of the masking module 706 can include one or more parameters to reverse or otherwise negate the masking applied by the first set of parameters. For example, if data 14B includes a full name of a customer of a commercial bank, the first set of masking parameters can be applied to redact the name in the view 708. The second set of masking parameters can be applied to remove redactions applied by the first set of masking data to enable the view 708 to include unmasked data. The second set of masking parameters can operate to prevent the first set of masking parameters from being applied in a first instance, or reverse the masking.

By enabling the second set of masking parameters to unmask previously masked data, a single view 708 can switch between permitting access to unmasked and masked data, without generating or otherwise impacting the data staging zone 702. In this way, the complexity of managing data access can be reduced by removing the number of views 708 needed to view data. Moreover, the views 708 can be better defined as resources are concentrated on fewer views 708 and data staging zones 702.

The masking module 706 can apply masking to the data within the data staging zone 702 on a level of granularity smaller than the data shown within the view 708. For example, the masking module 706 can apply the masking parameters on a column level, such that a view of 708 can include data having two or more different sets of masking parameters applied (e.g., a view 708 can have a column with masking parameters A (first) and B (second) applied, and an adjacent column with masking parameters C (first) and B (second) applied).

The masking module 706 can apply masking dynamically. That is, the masking module 706 can be configured to detect or receive changes related to either of the first set of masking parameters or the second set of masking parameters, and update the views 708 in real time, near real time, periodically, etc.

The masking module 706, and the masking parameters therein, are maintained or created by one or more of the operations user 24B, a data owner 24C, and a project administrator 24D.

The operations user 24B can adjust or implement the sets of masking parameters, for example, via the data catalog 22. In this way, the data catalog 22 can provide an operations user 24B with the ability to manipulate parameters associated with discovery of data, and with access to any discovered data. For example, a workflow can be implemented where new data sources detected by the application 38 (e.g., block 502) are brought to the attention of the operations user 24B for labelling of the first set of masking parameters. The workflow can preclude the new data source from being viewed or otherwise accessed, by any user, or non-operations users 24B in the data catalog 22, until the masking parameters have been defined. In this way, robust data access policing is ensured for all data accessible via the data catalog 22.

The operation user 24B can update masking parameters directly, or suggest masking parameters or otherwise collaborate with the data owner 24C and/or the project user 24D via a review process 710. The review process 710 can include a review workflow 712, specifying the order of operations for approving masking parameters and data access. For example, the review process 710 can start with the data owner 24C specifying a minimum degree of masking required to have the data accessible within a computing environment (e.g., the first set of masking parameters stored in a data configuration 28B). The project user 24D can request that the second set of masking parameters enable the project to unmask certain data, or establish a procedure for unmasking data.

In addition to determining masking operations applied to the data 14B, the review process 710 includes determining masking parameters to be applied based on a user account 24, or a project zone 716 (e.g., the second set of masking parameters). The project administrator user 24D can configure access user access to the project zone 716 and configure the project zone 716 with the second set of masking parameters. For example, the project administrator user 24D can configure the second set of masking parameters such that any data not specifically identified for viewing is tokenized, limiting the scope of exposed data 14B. To provide another, more detailed example, the project administrator user 24D can establish two different project zones 716A and 716B, one each for different jurisdictions of data (e.g., U.S. credit card data and Canadian credit card data), request access to the corresponding views 708 (shown as views 708A, having U.S. data, and view 708B, having Canadian data), and configure the same second set of masking parameters to be applied to both project zones 716A and 716B, or apply different second set of masking parameters to each project (e.g., the project 716A can allow for access to a third party credit score unavailable in the second project 716B). The project administrator user 24D can create another project zone (not shown) which has access to all the data available to both zones 716A and 716B, to review any reports generated by the project zones 716A and 716B. In at least some contemplated embodiments, the second set of parameters is applied on a user account 24 basis, such that in the aforementioned example the project administrator user 24D can provide different masking parameters to the different users of a single project zone 716. This may allow a single view 708 to be used for the whole project (and simplifying the data access approval procedure to access a view). In this example, the view 708 is different for each user, but contains access to all credit card data for North America.

The review process 710 can also facilitate dynamic masking parameter implementations. For example, data owner users 24C can periodically update the first set of masking parameters, for example, in response to regulatory requirements, and have the changes propagated to all enterprise data within the computing resources 8.

The review process 710 can be integrated into the data catalog 22. For example, pending access requests or requests to implement masking parameters on data sources can be established via a graphic user interface (GUI) of the data catalog 22. The data catalog 22 can be accessed by the device 4, remotely, or the device 4 can instantiate the data catalog 22 directly to request access to stored data 15A.

Figure 8:
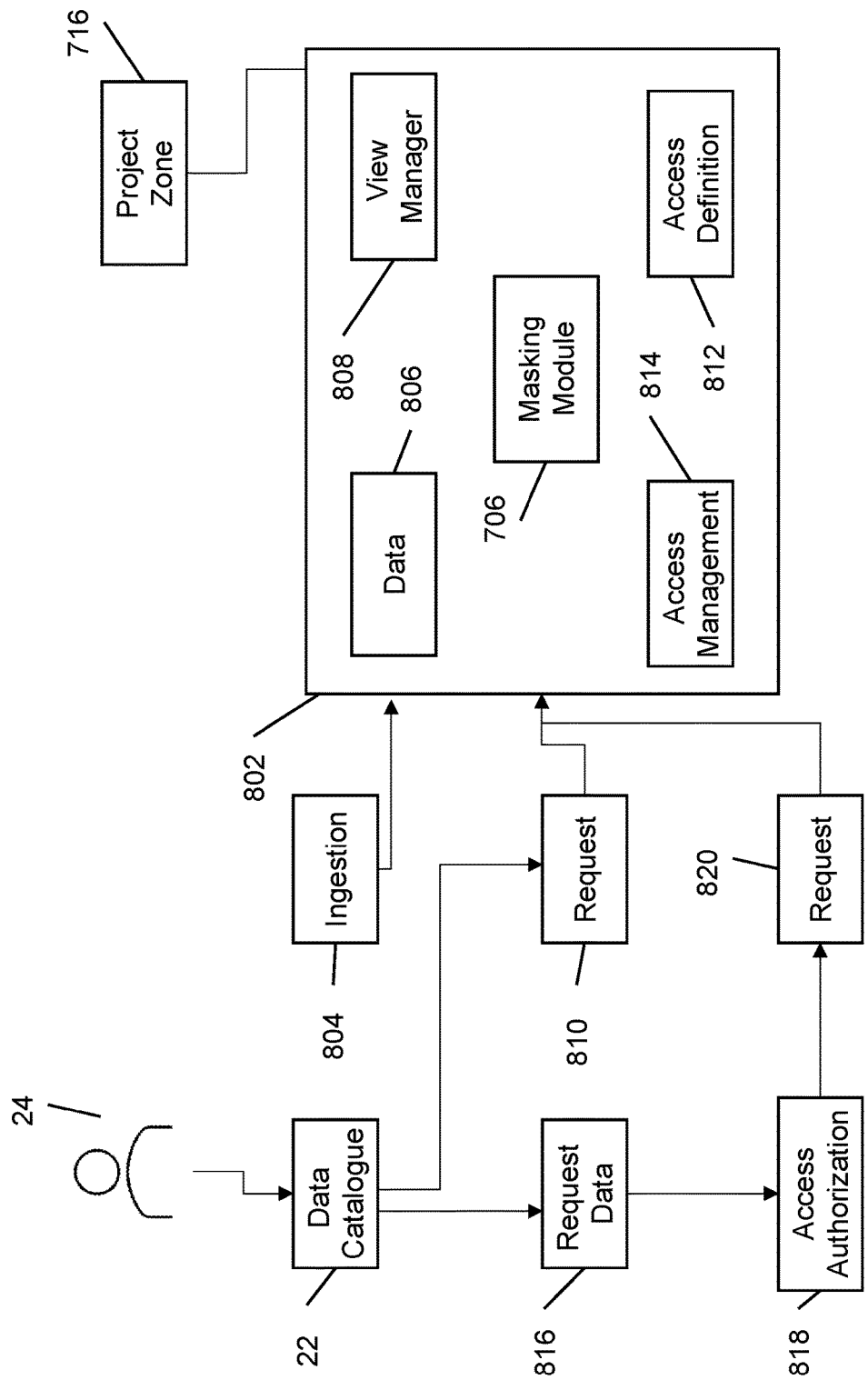
FIG. 8 is a flow diagram showing an example framework for managing access to remote data.

Referring now to FIG. 8, a flow diagram showing an example framework for managing access to remote data is shown. As described herein, data 14B may be ingested into a remote computing environment 802 by an ingestion module 804, for display or other access. The ingested data 14B can be stored in the data staging zone 806, and access to the data in the data staging zone 806 can be provided by a view manager 808.

As described herein, one or more masking operations are applied by the masking module 706, where at least some masking parameters operate independent of the user 24 requesting the data, and apply to data in the data staging zone 806. Another set of masking parameters are applied to data accessible via the view manager 808 based on the set of access rights provided by the user 24. Example use case scenarios shall be discussed below.

In an example scenario, a user 24, for example via a data catalog 22, can generate a request 810 to view the data 14B. The request 810 include a set of access parameters defining, or allow for determining of, the rights of the user account 24, or a project zone 716, relative to data 14B. The data access parameters can define the rights of the user account 24 solely by participation in a project zone (e.g., project zone 716). The set of access parameters can be based on the role of the user account 24 (e.g., data scientist user accounts 24 can have greater access rights compared to business analyst user accounts 24).

The set of access parameters can be stored by the computing environment 806, with, for example, rights defining whether access is granted being stored in an access management module 814, and the parameters defining the nature of the access (e.g., which masking parameters must be applied) being stored within an access definition module 812.

Upon receiving the request 810, the masking module 706 can determine one or more second set of masking parameters to be applied to a view.

The masking module 706 can be configured to apply both the first set of masking parameters and the second set of masking parameters, or the masking module 706 can be configured to determine whether the second set of masking parameters are greater or equal to the first set of masking parameters, and apply the second set of masking parameters in favor of the first set of the masking parameters. For example, the masking module 706 can tokenize redacted data (i.e., the result of the first set of masking parameters), or the masking module 706 can be configured to apply tokenization to the data in the data staging zone 806 without first applying the first set of masking parameters to avoid costs associated with redundant processing.

The project zone 716 can thereafter be provided to access to a view, via view manager 808, with data masked in a manner responsive to the request.

In another example scenario, a project zone 716 user can generate a request 816 for additional access rights to the data 14B after reviewing a view having a first group of masking parameters applied. For example, a data scientist user may want to access unmasked address data to determine the impact of residence on the likelihood to enroll for a new credit card offering, where address data was previously masked.

At block 818, the request 816 to be provided with the second set of access credentials is reviewed. The review can be performed, for example, in accordance with the review process 710. The review can accept the request 816, or propose revisions, etc. For example, the number of columns which are unmasked can be reduced relative to the request 816, stipulations on the access rights can be provided (e.g., a required location, time of day, access credentials (e.g., two factor authentication) etc.).

Upon approval, a request 820 to update the masking parameters associated with the second set of masking rights is transmitted. The request can be transmitted to the access management module 814 and the access definition module 812, which can update metadata associated with the view to enable a second set of masking parameters which can unmask the first set of parameters for accounts with the second set of access rights.

Enabling unmasked data review can include two processes: (1) a process whereby a second set of parameters which unmask the first set of parameters are made available, and (2) a second process whereby the second set of access rights is associated with, for example, the project zone 716. In example embodiments, different users provide input into the two different processes. For example, a project manager user 24C or a project data owner 24D can be required to approve any request to associate the unmasking second set of masking parameters with a project zone 716. The operator user 24B can separately have access to the unmasking second set of parameters, to avoid inadvertent disclosure of these parameters. This can be helpful in circumstances where the project administrator 24C is unfamiliar with the specifics implementing masking parameters.

The elements within the remote computing environment 802 (e.g., the data zone 806, the view manager 808, etc.) are not shown as being connected in FIG. 8, solely to maintain visual clarity. Although not shown, it is understood that a process of ingesting data of the remote computing environment 8 can be defined by ingestion module 804, the data zone 806, and the view manager 808. A process for providing access to the ingested data can be defined by the request 810, and the masking module 706 in cooperation with the data staging zone 806 and the manager 808. A process to request unmasked data can be defined by the request 816 and 820, the access authorization 818, and the access management module 814 and the access definition module 812. Collectively these three processes, alternatively referred to as three flows, can be used to manage access to unmasked data.

Figure 9:
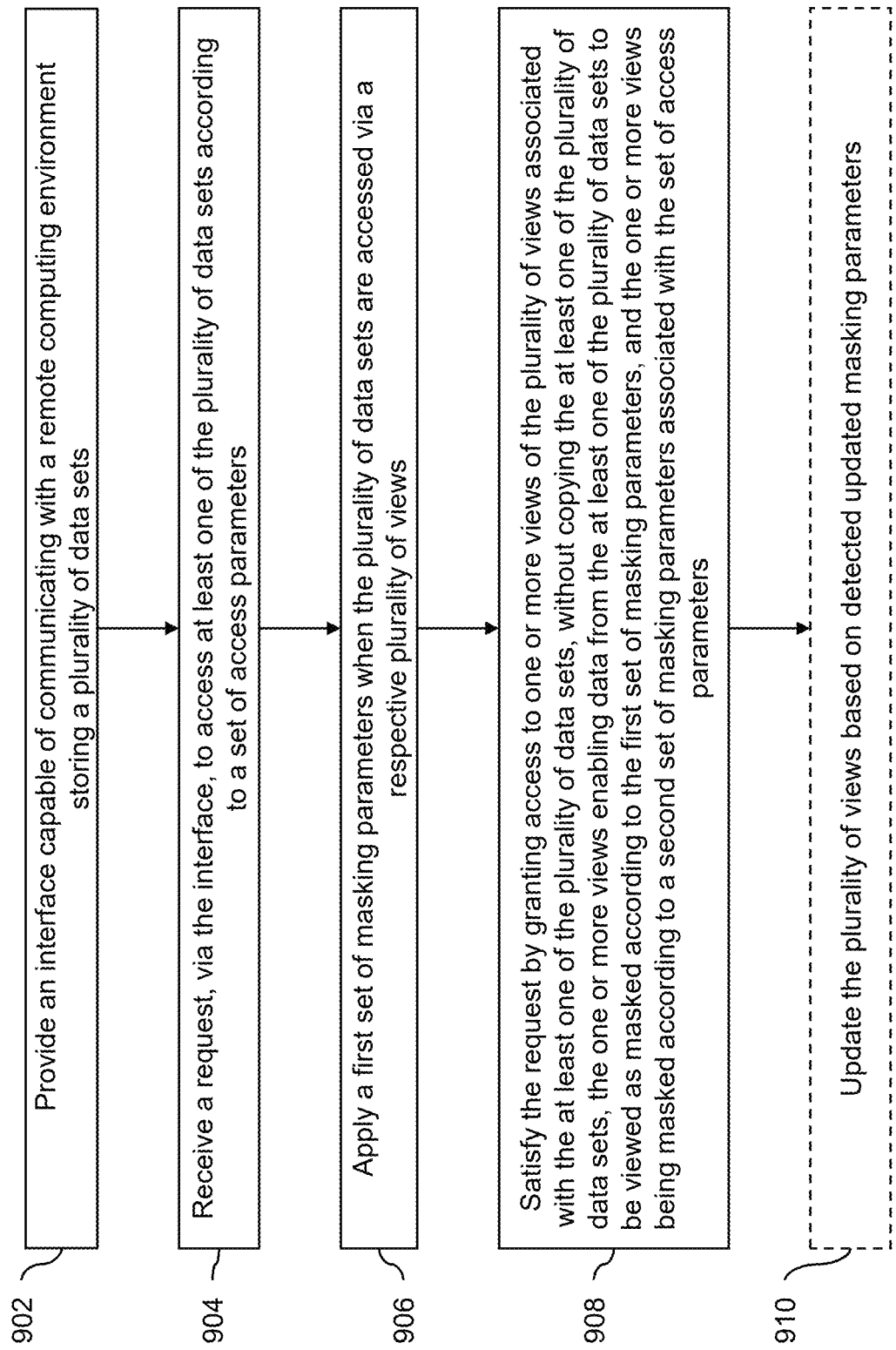
FIG. 9 is a flow diagram of an example method for providing access to remote data is disclosed

Referring now to FIG. 9, a flow diagram of an example method for providing access to remote data is disclosed. To provide illustrative context to the method shown in FIG. 9, reference shall be made to the preceding figures. It is understood that the reference to the preceding figures is not intended to be limiting in any way.

At block 902, and interface (e.g., the data catalog 22) capable of communicating with a remote computing environment 8 storing a plurality of data sets (e.g., data 14C) of the enterprise system 6 is provided.

At block 904, the interface receives a request to access at least one of the plurality of data sets according to a set of access parameters (e.g., the parameters stored in either of the access management module 814 or the access definition module 812).

A block 906, the first set of masking parameters are applied to data sets managed by the view manager 808.

The block 908, a response to the request to access the data sets is provided. The response includes one or more views of a plurality views associated with the requested plurality of data sets. Views, in contrast to the data 14B, can be configured to prevent changes, and provide a manner of avoiding inadvertent data loss or protect against adversarial efforts.

The provided views show data according to the set of masking parameters which are associated with the set of access parameters provided in block 904.

For example, the first set of masking parameters can redact data as it's being used to populate a view. The second set of masking parameters can apply to the already redacted data, or override the first of masking parameters.

Optionally, at block 910, the plurality of views can be updated based on a received or detected update to the masking parameters. For example, where a project has been completed, the second set of masking parameters associated with the project zone 716 can be automatically changed to apply second set of masking parameters that effectively removes all access rights previously enjoyed by the project zone 716.

Figure 10:
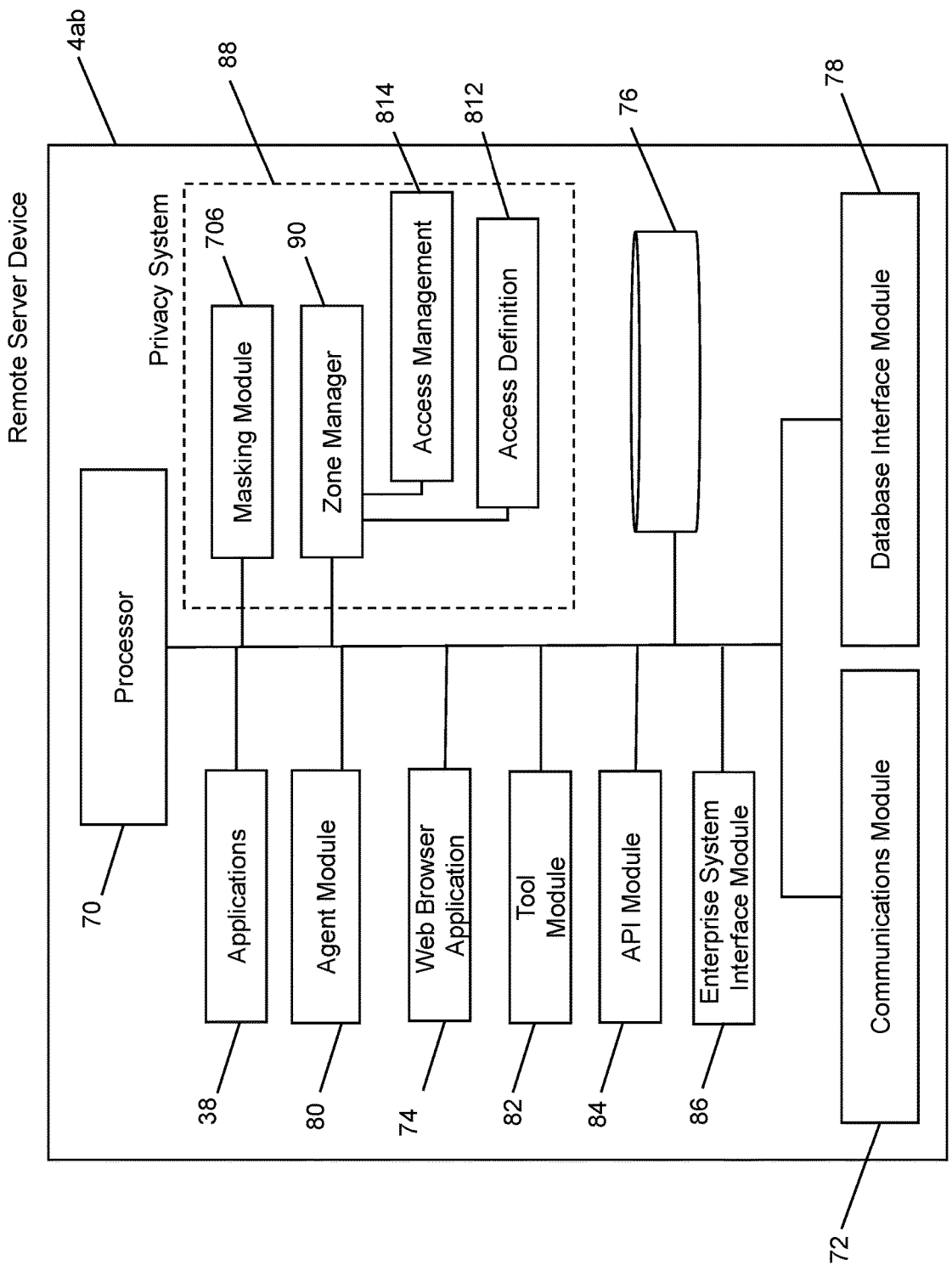
FIG. 10 is a block diagram of an example remote computing device.

In FIG. 10, an example configuration of a remote service device 4, for performing the functionality of the remote computing environment 8 as described herein, is shown. The remote service device 4 includes a communications module 72 that enables the remote service device 4 to communicate with one or more other components of the computing environment 2, such as the enterprise system 6, or the data ingestion module 12, etc., via a bus or other communication network, such as the communication network 10. While not delineated in FIG. 10, the remote service device 4 includes at least one memory or memory device that can include a tangible and non-transitory computer-readable medium having stored therein computer programs, sets of instructions, code, or data to be executed by one or more processors (not shown for clarity of illustration). It can be appreciated that any of the components shown in FIG. 10 may also be hosted externally and be available to the remote computing environment 8, e.g., via the communications module 62.

In the example embodiment shown in FIG. 10, the remote service device 4 includes one or more processors 70 to provide access to data 14B. Exemplary processors 70 can be purpose specific, for example to execute modules or applications, include a web browser application 74, operations to manipulate the data 14, and so forth. Although not shown in FIG. 10, as noted above, the remote service device 4 may also include a cryptographic server for performing cryptographic operations and providing cryptographic services. The cryptographic server can also be configured to communicate and operate with a cryptographic infrastructure. The remote service device 4 may also include one or more data storage elements for storing and providing data for use in such services, such as data storage 76.

The remote service device 4 can include a database interface module 78, for communicating with data stores used to store the data 14 (i.e., where the data 14 is stored in a distributed fashion).

The remote service device 4 includes an applications module 38B, for executing applications 38, and agent module 80, for executing the agent 20B, a tool module 82, for executing, for example, tool 8A, an application programming interface (API) module 84, for facilitating communication with other elements in the computing environment 8, and an enterprise specific interface module 86 which can be configured by the enterprise system 6 (e.g., to include the topology 16).

The remote service device 4 can include a privacy system 88 for administering access and masking policies (e.g., data configurations 28B and account configurations 28A). The privacy system 88 can include the masking module 706, and a zone manager 90, which can include, for example, the access management module 814 enforcing the access rights of the user to specific zones, and the access definition module 815.

Figure 11:
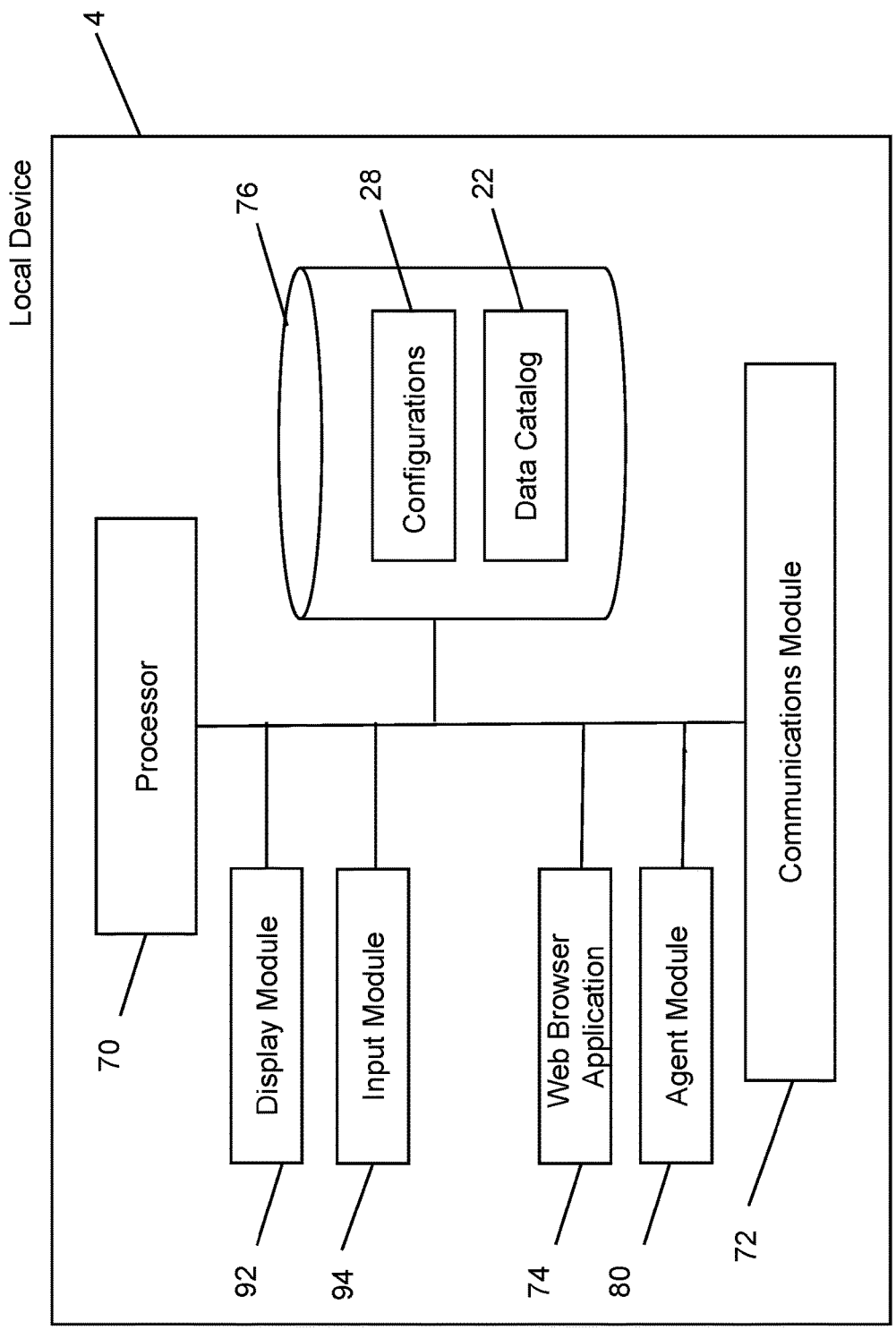
FIG. 11 is a block diagram of a local computing device.

In FIG. 11, an example configuration of a local device 4 is shown. It can be appreciated that the local device 4 shown in FIG. 6 can correspond to an actual device or represent a simulation of such a local device 4. In certain embodiments, the local device 4 may include one or more processors 70, a communications module 72, a data store 76, a web application browser 74, and an agent module 80 (i.e., for executing the local agent 20A), similar to the remote services device 4 of FIG. 10.

While not delineated in FIG. 11, the local device 4 includes at least one memory or memory device that can include a tangible and non-transitory computer-readable medium having stored therein computer programs, sets of instructions, code, or data to be executed by processor 70. FIG. 11 illustrates examples of modules and applications stored in memory on the local device 4 and operated by the processor 70. It can be appreciated that any of the modules and applications shown in FIG. 11, or FIG. 10, may also be hosted externally and be available to the device 4, e.g., via the communications module 72.

In the example embodiment shown in FIG. 11, the local device 4 includes a display module 84 for rendering GUIs and other visual outputs on a display device such as a display screen, and an input module 94 for processing user or other inputs received at the local device 4 e.g., via a touchscreen, input button, transceiver, microphone, keyboard, etc.

The data store 76 may be used to store device data 76, such as, but not limited to, an IP address or a MAC address that uniquely identifies local device 4. The local device 4 may also include the data catalog 22 and the configurations 28 stored in the local data store 76, and other data, such as, but not limited to, login credentials, user preferences, cryptographic data (e.g., cryptographic keys), etc.

It will be appreciated that only certain modules, applications, tools, and engines are shown in FIGS. 1-3, 7, 8, 10 and 11 for ease of illustration and various other components would be provided and utilized by, for example, the enterprise system 6 or the remote resources 8, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 2, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for managing remotely stored data, the system comprising:
    a processor; and
    a memory coupled to the processor, the memory storing computer executable instructions that when executed by the processor cause the system to:
        provide a remote agent within a remote computing environment, the remote agent having access to a plurality of data stored by the remote computing environment and to a custom application, wherein the plurality of data comprise substantive data and metadata reflecting a state of the plurality of data, and wherein the plurality of data are stored according to a topology defining an organizational principle for data ingestion and storage, wherein the topology references at least one data object used to store the plurality of data;
        provide a local agent in a local computing environment, the local agent being able to communicate with the remote agent and with a data catalogue populated with the metadata and comprising a plurality of views of the metadata, the local agent having access to configuration files comprising one or more account configuration files defining permissions for accessing the local agent and one or more data configuration files defining data configurations visible to the local agent based on corresponding permissions;
        instruct the remote agent, by the local agent, to execute the custom application based on a data configuration file of the one or more data configuration files defining a data configuration visible to the local agent, wherein the custom application is executed to identify any new data within the plurality of data by comparing a current state of the plurality of data to the topology reflecting a previous state of the plurality of data, and to harvest new metadata related to the new data, to return to the local agent;
        receive, by the local agent, the new metadata related to the new data according to the data configuration visible to the local agent;
        update, via the local agent, the plurality of views within the data catalogue based on the new metadata, while limiting exposure of the plurality of data to the data catalogue; and
        in response to receiving a request to access at least a part of the plurality of data, display at least one view of the updated plurality of views within the data catalogue.

2. The system of claim 1, wherein, to update the data catalogue, the instructions cause the system to:
    access data sets of the plurality of data corresponding to one or more pre-existing data objects referenced in the topology, the one or more pre-existing data objects at least in part defining the data sets; and
    compare the accessed data sets to the one or more pre-existing data objects to determine new data for each data object.

3. The system of claim 1, wherein at least some of the plurality of views require different access credentials to review.

4. The system of claim 3, wherein at least some of the plurality of views comprise one or more profile fields, describing the bounds of the related data.

5. The system of claim 1, wherein at least some of the plurality of views comprise samples of the requested part.

6. The system of claim 1, wherein the instructions cause the system to:
    enable the at least one view to display a sample of the requested part.

7. The system of claim 1, wherein the instructions cause the system to:
    in response to receiving a request to restrict access to at least some of the plurality of data, validate the request; and
    restrict access to any views of the plurality of views showing the at least some of the plurality of data according to the request.

8. The system of claim 1, wherein the local agent instructs the remote agent in response to receiving a request to view the plurality of data.

9. The system of claim 1, wherein the plurality of data are defined by a plurality of data objects in the configuration files.

10. A method for managing remotely stored data, the method comprising:
    providing a remote agent within a remote computing environment, the remote agent having access to a plurality of data stored by the remote computing environment and to a custom application, wherein the plurality of data comprise substantive data and metadata reflecting a state of the plurality of data, and wherein the plurality of data are stored according to a topology defining an organizational principle for data ingestion and storage, wherein the topology references at least one data object used to store the plurality of data;
    providing a local agent in a local computing environment, the local agent being able to communicate with the remote agent and with a data catalogue populated with the metadata and comprising a plurality of views of the metadata, the local agent having access to configuration files comprising one or more account configuration files defining permissions for accessing the local agent and one or more data configuration files defining data configurations visible to the local agent based on corresponding permissions;
    instructing the remote agent, by the local agent, to execute the custom application based on a data configuration file of the one or more data configuration files defining a data configuration visible to the local agent, wherein the custom application is executed to identify any new data within the plurality of data by comparing a current state of the plurality of data to the topology reflecting a previous state of the plurality of data, and to harvest new metadata related to the new data, to return to the local agent;
    receiving, by the local agent, the new metadata related to the new data according to the data configuration visible to the local agent;
    updating, via the local agent, the plurality of views within the data catalogue based on the new metadata, while limiting exposure of the plurality of data to the data catalogue; and in response to receiving a request to access at least a part of the plurality of data, display at least one view of the updated plurality of views within the data catalogue.

11. The method of claim 10, wherein, updating the data catalogue comprises:
accessing data sets of the plurality of data corresponding to one or more pre-existing data objects referenced in the topology, the one or more pre-existing data objects at least in part defining the data sets; and
comparing the accessed data sets to the one or more pre-existing data objects to determine new data for each data object.

12. The method of claim 10, wherein at least some of the plurality of views require different access credentials to review.

13. A non-transitory computer readable medium for managing remotely stored data, the computer readable medium comprising computer executable instructions for:
providing a remote agent within a remote computing environment, the remote agent having access to a plurality of data stored by the remote computing environment and to a custom application, wherein the plurality of data comprise substantive data and metadata reflecting a state of the plurality of data, and wherein the plurality of data are stored according to a topology defining an organizational principle for data ingestion and storage, wherein the topology references at least one data object used to store the plurality of data;
providing a local agent in a local computing environment, the local agent being able to communicate with the remote agent and with a data catalogue populated with the metadata and comprising a plurality of views of the metadata, the local agent having access to configuration files comprising one or more account configuration files defining permissions for accessing the local agent and one or more data configuration files defining data configurations visible to the local agent based on corresponding permissions;
instructing the remote agent, by the local agent, to execute the custom application based on a data configuration file of the one or more data configuration files defining a data configuration visible to the local agent, wherein the custom application is executed to identify any new data within the plurality of data by comparing a current state of the plurality of data to the topology reflecting a previous state of the plurality of data, to harvest new metadata related to the new data, to return to the local agent;
receiving, by the local agent, the metadata related to the new data according to the data configuration visible to the local agent;
updating, via the local agent, the plurality of views within the data catalogue based on the new metadata, while limiting exposure of the plurality of data to the data catalogue; and
in response to receiving a request to access at least a part of the plurality of data, display at least one view of the updated plurality of views within the data catalogue.

14. The method of claim 10, wherein at least some of the plurality of views comprise samples of the requested part.

15. The method of claim 10, further comprising:
enabling the at least one view to display a sample of the requested part.

16. The method of claim 10, further comprising:
in response to receiving a request to restrict access to at least some of the plurality of data, validating the request; and
restricting access to any views of the plurality of views showing the at least some of the plurality of data according to the request parameters.

17. The system of claim 1, wherein the remote agent further has access to one or more tools for interacting with computing resources within the remote computing environment, and wherein the one or more tools include a machine learning tool.

18. The method of claim 10, wherein the remote agent further has access to one or more tools for interacting with computing resources within the remote computing environment, and wherein the one or more tools include a machine learning tool.

19. The method of claim 10, wherein the local agent instructs the remote agent in response to receiving a request to view the plurality of data.

20. The method of claim 10, wherein the plurality of data are defined by a plurality of data objects in the configuration files.

* * * * *